UNITED STATES PATENT OFFICE.

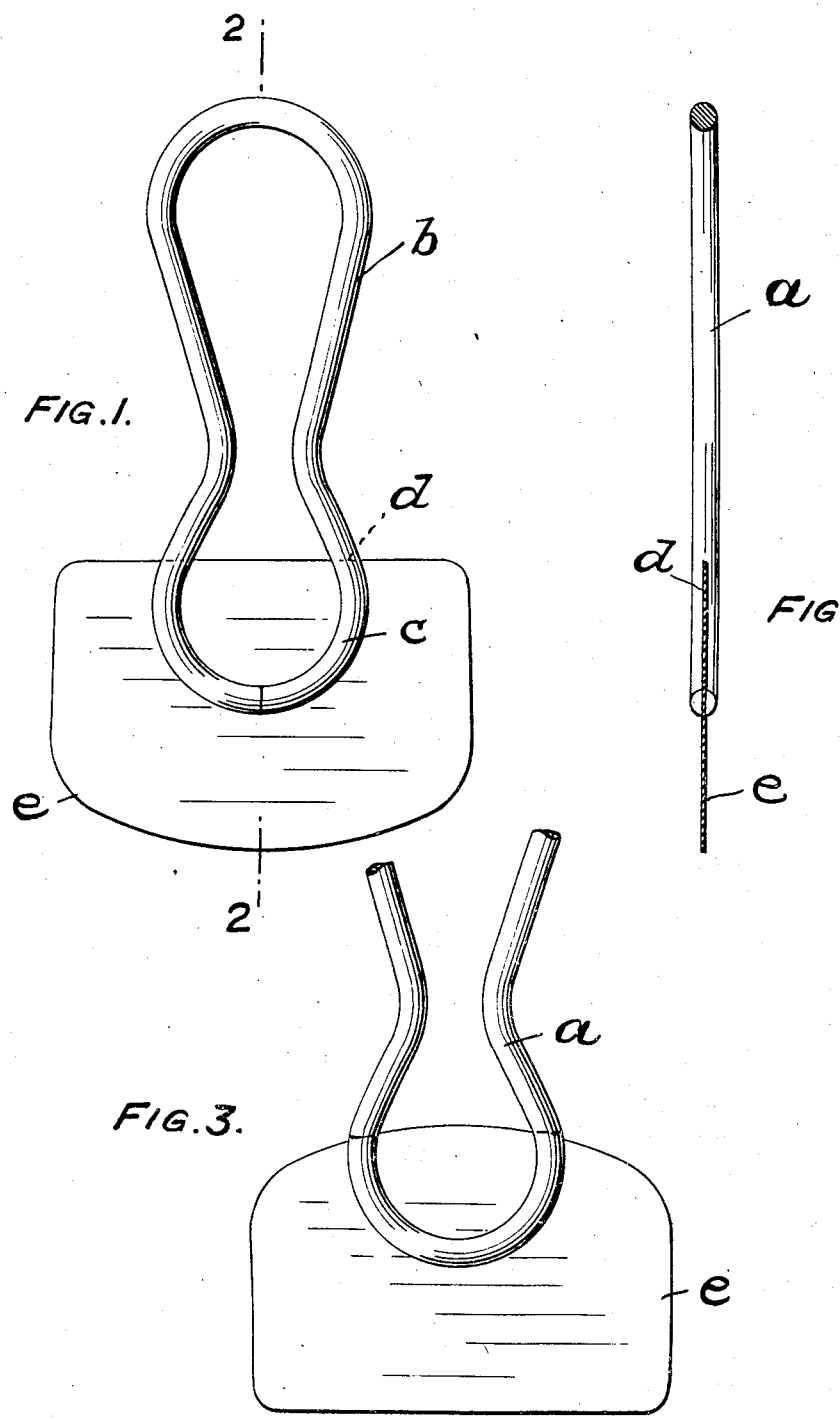

OTTO SPAHR, OF PHILADELPHIA, PENNSYLVANIA.

BOWL-SCRAPER.

1,325,540. Specification of Letters Patent. Patented Dec. 23, 1919.

Application filed August 10, 1918. Serial No. 249,266.

*To all whom it may concern:*

Be it known that I, OTTO SPAHR, a citizen of the United States, residing at Philadelphia, county of Philadelphia, and State of Pennsylvania, have invented a new and useful Improvement in Bowl-Scrapers, of which the following is a full, clear, and exact description, reference being had to the accompanying drawings, which form a part of this specification.

The object of my invention is to produce a kitchen utensil which is adapted for scraping the interior of bowls, dishes, plates, kettles, pans, pots, etc., to insure the removal from the surface of all adherent materials, and which, while adaptable to flat surfaces, is also available for cleaning concave surfaces and corners between flat and curved surfaces.

A preferred embodiment of the invention is shown in the accompanying drawings, wherein—

Figure 1 is an elevational view of my improved scraper.

Fig. 2 is a longitudinal section on line 2—2 of Fig. 1.

Fig. 3 is a partial view, similar to Fig. 1, with scraper blade inserted.

The handle comprises a metal rod $a$ which is bent upon itself to form a frame of considerably greater length than width. It is preferred, between the ends of the frame, to curve the opposing arms inwardly toward each other, thereby forming a loop-shaped handle member $b$ and a loop-shaped holder member $c$. It is preferred to locate the approximating ends of the rod at the center of the front of the holder member, as shown, although this is not essential.

The holder member $c$ is grooved or slitted in the direction of the plane of its extension and throughout a considerable part of its length, as shown at $d$. This slit accommodates a flat scraper plate or blade $e$. The plate $e$, if it is made of approximately the thickness of the width of the slit, may be held in the slit solely by its tight fit therein, that is, by frictional contact between the plate and the walls of the slit.

The plate $e$ is provided with a convexly curved front edge, a straight side edge which merges into the front edge by rounded corners, and a straight rear edge. The plate should be of flexible material. Celluloid is preferred. Thin sheet steel may be employed. Sheet rubber is less desirable, although quite satisfactory where a rubbing action, as distinguished from a scraping action, is desired. The plate is attached to the holder by forcibly slipping it into the slit $d$.

The practical advantages of this simple contrivance are more pronounced and numerous than would be immediately obvious.

The device comprises only two parts: the bent curved rod and the scraper plate.

The device will last for an indefinite time. If the scraper plate becomes worn, any one can readily cut out a new plate from a sheet of celluloid and substitute it for the discarded plate.

The shape and flexibility of the scraper is such that by suitable pressure its front edge may be conformed to the surface to be cleaned, whatever the shape of that surface may be. It is also effective to clean corners, as, for example, the junction between the flat bottom and concavely curved wall of a pan, pot or kettle.

The device may be readily suspended from a hook or nail.

The device is sanitary. By removing the scraper plate, the device may be thoroughly cleaned.

If it is desired to clean flat surfaces only, the scraper plate may be removed from the holder, reversed and reinserted so as to present a flat edge to the surface to be cleaned, as shown in Fig. 3.

Owing to the simplicity of the construction, the device may be manufactured at minimum cost.

Having now fully described my invention, what I claim and desire to protect by Letters Patent is:

1. A scraper for bowls, etc., comprising a handle composed of a rod bent upon itself to form an elongated frame and curved at opposite ends, the side members of the frame being bent inwardly toward each other to form a handle and a holder, the holder being provided with a slit extending in the direction of the longitudinal extension of the rod from the front of the holder rearward, and a scraper plate inserted in the slit.

2. A scraper for bowls, etc., comprising a rod the front end of which is bent in the form of a section of a ring and slitted in the direction of longitudinal extension of the rod throughout a considerable arc of the curve of the rod, and a scraper plate of a thickness approximating the width of the slit and held therein by frictional engagement.

In testimony of which invention I have hereunto set my hand, at Philadelphia, Pa., on this 8th day of August, 1918.

OTTO SPAHR.